US009866466B2

(12) United States Patent
Gopshtein et al.

(10) Patent No.: US 9,866,466 B2
(45) Date of Patent: Jan. 9, 2018

(54) SIMULATING REAL USER ISSUES IN SUPPORT ENVIRONMENTS

(71) Applicant: Hewlett-Packard Development Company, L.P., Houston, TX (US)

(72) Inventors: Michael Gopshtein, Yahud (IL); Amichai Nitsan, Rehovot (IL); Eyal Kenigsberg, Dolev (IL)

(73) Assignee: ENTIT SOFTWARE LLC, Sunnyvale, CA (US)

( * ) Notice: Subject to any disclaimer, the term of this patent is extended or adjusted under 35 U.S.C. 154(b) by 263 days.

(21) Appl. No.: 13/746,025

(22) Filed: Jan. 21, 2013

(65) Prior Publication Data
US 2014/0207935 A1    Jul. 24, 2014

(51) Int. Cl.
*H04L 12/26* (2006.01)
*H04L 12/24* (2006.01)
*H04L 29/08* (2006.01)

(52) U.S. Cl.
CPC .......... *H04L 43/50* (2013.01); *H04L 41/145* (2013.01); *H04L 43/00* (2013.01); *H04L 67/02* (2013.01); *H04L 67/025* (2013.01)

(58) Field of Classification Search
CPC ......... H04L 43/50; H04L 41/22; H04L 43/00; H04L 67/22; H04L 41/145; G06F 11/3438
USPC .................... 709/223, 224; 715/700; 726/22; 717/124
See application file for complete search history.

(56) References Cited

U.S. PATENT DOCUMENTS

| 7,970,857 | B2 * | 6/2011 | Schneider | H04L 67/02 709/217 |
| 8,332,765 | B2 * | 12/2012 | Ergan | G06F 3/04895 702/183 |
| 8,839,222 | B1 * | 9/2014 | Brandwine | G06F 8/65 717/168 |
| 2004/0054715 | A1 | 3/2004 | Cesario | |
| 2005/0278728 | A1 * | 12/2005 | Klementiev | G06F 9/45512 719/328 |
| 2007/0050844 | A1 | 3/2007 | Lebel | |
| 2007/0067450 | A1 * | 3/2007 | Malloy | H04L 43/00 709/224 |
| 2007/0180325 | A1 * | 8/2007 | Bailey | H04L 41/145 714/38.1 |

(Continued)

OTHER PUBLICATIONS

Andrica, et al., "WARR: a Tool for High-fidelity Web Application Record and Replay," In Proceedings of the International Conference on Dependable Systems and Networks, Jun. 2011, Hong Kong, China, 8 pages.

(Continued)

*Primary Examiner* — Patrice Winder
*Assistant Examiner* — Ruth Solomon

(57) ABSTRACT

Methods, systems, and computer-readable and executable instructions are provided for simulating real user issues in support environments. Simulating real user issues in support environments can include providing stored data related to a real user issue associated with an application to a support device having the ability to modify the application, the stored data can include network traffic associated with a user device in a live environment and inputs provided via the user device. Simulating real user issues in support environments can include causing the support device to simulate the real user issue using the stored data.

14 Claims, 4 Drawing Sheets

(56) References Cited

U.S. PATENT DOCUMENTS

| | | | |
|---|---|---|---|
| 2008/0005793 A1* | 1/2008 | Wenig | G06F 11/3438 726/22 |
| 2008/0262860 A1* | 10/2008 | Schneider | G06Q 10/10 705/1.1 |
| 2008/0320343 A1* | 12/2008 | Eickmeyer | G06F 11/0709 714/57 |
| 2009/0177926 A1* | 7/2009 | Schneider | G06F 11/2294 714/37 |
| 2011/0029643 A1* | 2/2011 | Hjelm | H04H 60/25 709/219 |
| 2011/0238723 A1 | 9/2011 | Weintraub et al. | |
| 2012/0084605 A1* | 4/2012 | Shilon | H04L 43/50 714/33 |
| 2012/0173966 A1 | 7/2012 | Powell et al. | |
| 2013/0167245 A1* | 6/2013 | Birtwhistle | G06Q 10/10 726/26 |
| 2013/0167249 A1* | 6/2013 | Birtwhistle | G06F 19/322 726/28 |

OTHER PUBLICATIONS

Kiciman, et al., "Live Monitoring: Using Adaptive Instrumentation and Analysis to Debug and Maintain Web Applications," Proceedings of 11th Workshop on Hot Topics in Operating Systems, May 7-9, 2007, San Diego, CA, USA, 6 pages.

* cited by examiner

US 9,866,466 B2

1

SIMULATING REAL USER ISSUES IN SUPPORT ENVIRONMENTS

BACKGROUND

Business processes may be a factor in the operational success of an organization. The business processes may be implemented using applications. As such, the organization may have an interest in ensuring that the applications operate properly (e.g., as intended). Therefore, the organization may pursue evaluating and/or fixing problems associated with an application.

DETAILED DESCRIPTION

Figure 1:
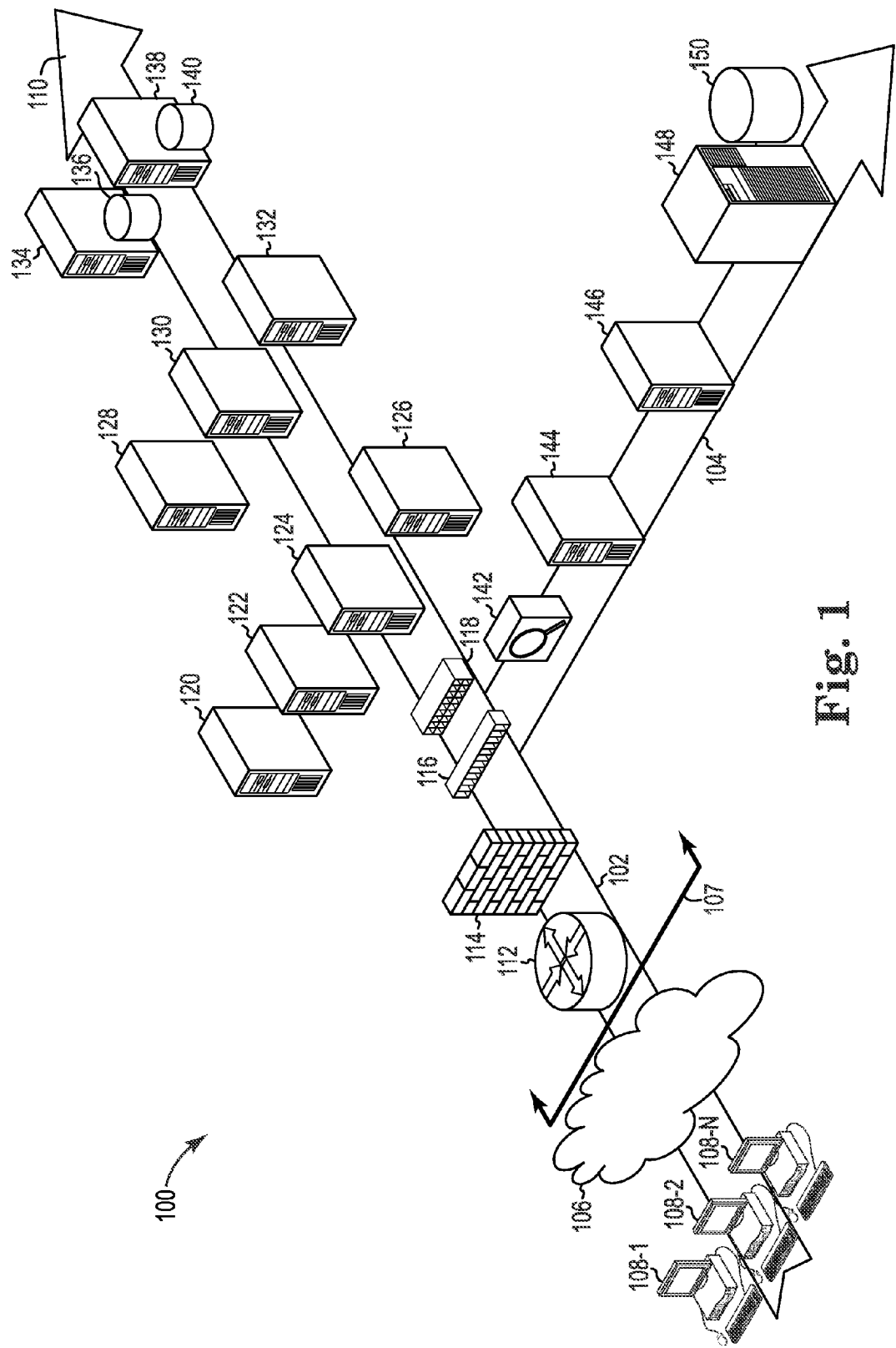
FIG. 1 illustrates a block diagram of an example of a system having live network traffic according to the present disclosure.

With increasing pressure on organizations to improve performance of their business processes (e.g., applications utilized by the business process), the organizations may seek to increase efficiencies, for instance, by pursuing efficient addressing of issues (e.g., application issues). An issue (e.g., a real user issue) can refer to difficulties encountered when, for example, executing a particular function (e.g., an application function) and/or a task within a particular application (e.g., a web browsing application) in a live environment, as described herein. Examples of such functions and/or tasks include customer relations management, inventory control, marketing, and/or accounting, among others, that can support one or more business processes.

For instance, a business process may involve selling products online. Accordingly, a real user issue can occur, for example, when an online store may not be able to process sales if the business's inventory system is not functioning and/or is functioning poorly (e.g., not as intended). Hence, the real user issue can, for example, relate to a user experiencing an undesirably long load time for a particular web page and/or undesirably long time to perform a particular function on the web page. Due to the diverse and complex nature of today's business processes measuring and/or managing such real user issues can be challenging, complex, and/or costly.

However, simulating the issues can assist in addressing (e.g., resolving) the issues. Some previous techniques for simulating real user issues may rely upon simulations performed in a live environment (e.g., a user environment). However, such approaches have proven to be complex and/or costly (e.g., time consuming), among other inefficiencies. Additionally, such approaches may not reproduce and/or may not accurately reproduce the issues due to a number of difficulties associated with reproduction in a live environment. For instance, live feedback (e.g., network traffic) may vary with time. That is, live feedback received when attempting reproduction of an original issue may not

2 replicate feedback received at the time of the original issue and/or may not enable reproduction of the original issue encountered by the real user.

In contrast, examples of the present disclosure include methods, systems, and computer-readable and executable instructions for simulating real user issues in support environments. As described herein, a support environment refers to an environment that can enable support personnel (e.g., an application developer) to support (e.g., modify) an application, for instance, based upon a real user issue simulated in the support environment. In various examples, stored data related to a real user issue associated with an application can be provided to a support device. A support device can refer to any suitable device having the ability to simulate the real user issue using the stored data and/or having an ability to modify the application. The stored data can include network traffic associated with a user device (e.g., captured network traffic) and/or inputs provided via the user device. For real user issues to be simulated in support environments, a support device (e.g., a support device located in a support environment) can be caused to simulate the real user issue using the stored data.

Figure 2:
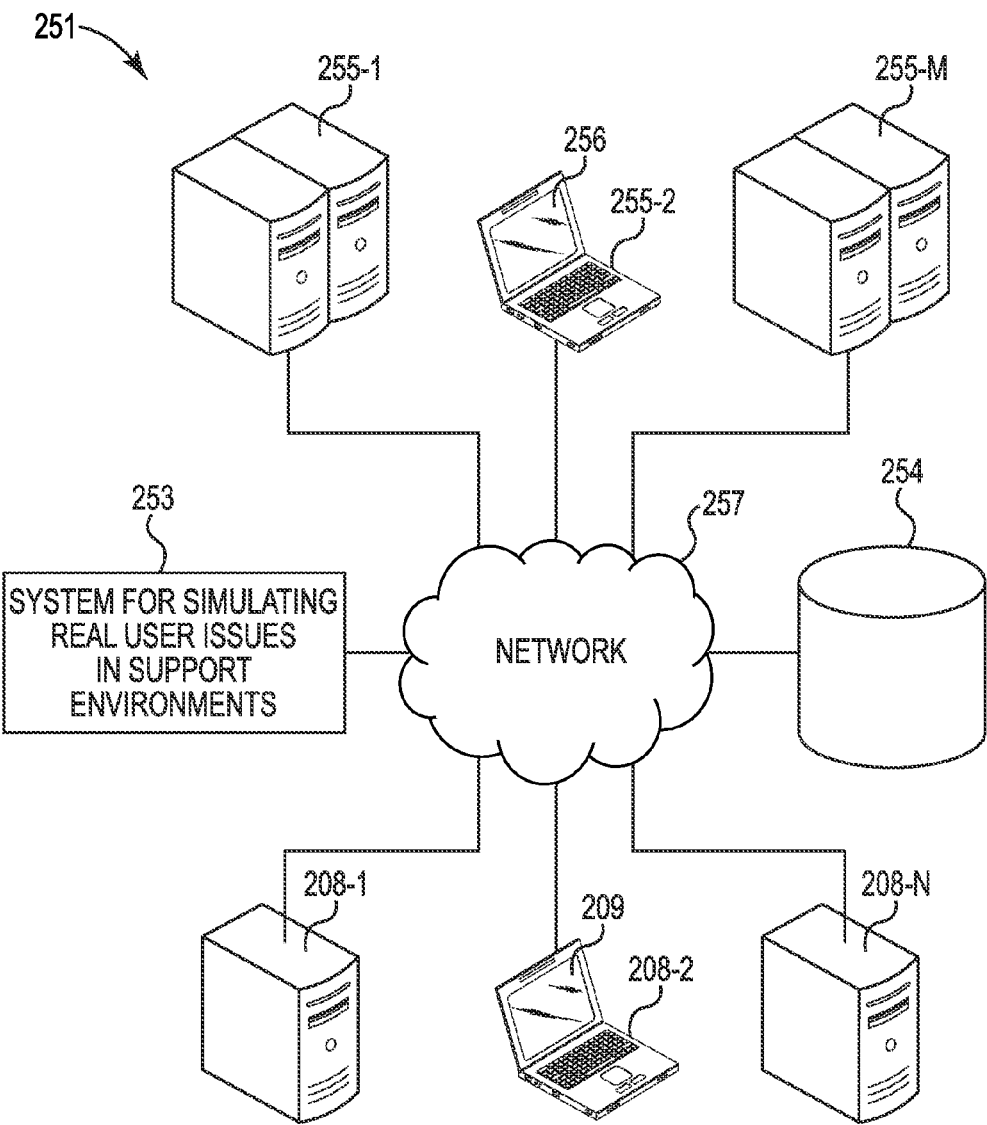
FIG. 2 illustrates a block diagram of an example of an environment in which various examples may be implemented according to the present disclosure.

As described herein, network traffic can refer to information moving through a computer network, for example, transmission control protocol (TCP) packets, among others. Network traffic can be monitored to facilitate assessing a business process, to evaluate security-related issues, and/or to measure operation of the network itself. Inputs can include inputs provided by a user (e.g., an employee), for example, via a graphical user interface (e.g., 209 as illustrated in FIG. 2). Inputs provided via the graphical user interface can include mouse clicks, audio inputs, tactile inputs (e.g., inputs made via a touch screen), for example, dragging objects displayed in the user interface, and/or a number of key events (e.g., a down key event associated with depressing a key and/or an up key event associated with a release of a key) on a key board associated with the graphical user interface, among other inputs. The inputs can include a number of identifiers, for example, an identifier of the particular type of input, a session identifier associated with the input, an identifier of an element that the input acted upon (e.g. an HTML element), a position identifier, and/or a time identifier (e.g., an elapsed since a previous input). The position identifier (e.g., pixel coordinates, such as X and Y coordinates) can be associated with a cursor (e.g., a mouse) on the graphical user interface. Such identifiers can facilitate matching of the inputs to the network traffic.

As described herein, a live environment refers to an environment having a real user interaction provided by a user device (e.g., a device capable receiving live network traffic in response to the real user inputs) in communication with devices (e.g., servers) other than devices (e.g., the support devices) contained in the support environment. That is, the live environment is separate and distinct from the support environment. As described herein, being separate and distinct refers to an environment being physically separate and/or having separate network resources (e.g., network resources to create network traffic) with respect to another network. In this manner, applications can be tested (e.g., debugged) using traffic derived from actual user (e.g., customer) network traffic (e.g., live traffic), thereby avoiding the complications and expense (e.g., expenses associated with having each version of a particular server in a live environment in the support environment as well) of having to create such network traffic originally in a support environment, among other advantages.

An issue can be determined by those supporting an application (e.g., a developer of an application and/or an IT administrator) and/or by those using the application (e.g. a real user). An issue can be based on a service level agreement (SLA), and/or determined automatically (e.g., by a business service module (BSM)), among other ways to determine an issue. In some examples, additional advantages can be realized by integration of such methods, systems, and computer-readable and executable instructions with a performance monitoring solution, for example, the BSM, as described herein. Such integration can facilitate automatic detection of the issues (e.g., real user issues) and/or automatic data collection (e.g., upon determination of an issue).

In the following detailed description of the present disclosure, reference is made to the accompanying drawings that form a part hereof, and in which is shown by way of illustration how examples of the present disclosure can be practiced. These examples are described in sufficient detail to enable those of ordinary skill in the art to practice the examples of this disclosure, and it is to be understood that other examples can be utilized and that process, electrical, and/or structural changes can be made without departing from the scope of the present disclosure.

As will be appreciated, elements shown in the various examples herein can be added, exchanged, and/or eliminated so as to provide a number of additional examples of the present disclosure. In addition, the proportion and the relative scale of the elements provided in the figures are intended to illustrate the examples of the present disclosure, and should not be taken in a limiting sense. As used herein, "a number of" an element and/or feature can refer to one or more of such elements and/or features. In addition, "for example" and similar phrasing is intended to mean, "by way of example and not by way of limitation".

FIG. 1 illustrates a block diagram of an example of a system 100 having live network traffic according to the present disclosure. The system 100 can include a network 106 coupling a number of user devices 108-1, 108-2, . . . 108-N to the computing devices of a business entity (e.g., an organization) that, for example, may be used in implementing a business process. The number of user devices 108-1, 108-2, . . . 108-N can receive inputs (e.g., user inputs). That is, the inputs can be provided via the user devices, for example, via a graphical user interface associated with the user devices. The inputs can be input prior to and/or in response to the live network traffic, as described herein. Examples of user devices can include computers (e.g., laptop computers), cell phones, personal data assistants, among other devices suitable to receive the inputs.

Boundary 107 indicates on FIG. 1 the demarcation of computing devices coupled to the network 106 that may be associated with the business entity. The network 106 can include a number of local area networks (LANs), a public network (e.g., the Internet), and/or a number of private networks (e.g., an intranet).

The computing devices of the business entity can establish a main communication path 110 to the network 106 and/or be coupled to one another via the communication link 102. For example, the communication link 102 may include a router 112 coupled to the network 106, a firewall 114 coupled to the router 112, and a switch 116 coupled to the firewall 114, among other components. The main communication path 110 from the switch 116 by which a business process may be implemented may include a load balancer 118 coupled to the switch 116, a number of servers (e.g., servers 120, 122, 124, 126, 128, 130, 132, 134, 138), and/or a number of associated databases (e.g., databases 136, 140) coupled to the load balancer 118 and/or the main communication path 110.

The number of servers (e.g., application servers) can, for example, include web servers (e.g., web exchange servers), email servers (e.g., POP-3 servers), and/or file transfer servers, among other types of servers. Each of the number of servers can include a number of applications running thereon. Such applications can include applications to provide, for example, such functions as website hosting and/or browsing, inventory management, email management, Internet connectivity, file management, and databases, among others. Business processes, may be implemented using a number of applications executing on the number of servers. The servers can be a machine such as a computing device. A computing device can include processor resources and/or hardwired logic (e.g., control circuitry) such as a state machine, application specific integrated circuit (ASIC), controller, and/or similar machine.

The computing devices of the business entity can also include a network monitoring probe 142 to collect the live network traffic and/or the data (e.g., user inputs) therefrom. For example, the network monitoring probe 142 can monitor a plurality of requests and responses sent via transmission control protocol/Internet protocol (TCP/IP) on the main communication path 110 (e.g., as passes through the switch 116). The network monitoring probe 142 can monitor the live network traffic, for example, through switch 116 to extract a monitoring communication path 104. That is, the network monitoring probe 142 can be coupled to the switch 116. According to one or more examples, a network monitoring engine 144 (e.g., Real User Monitor (RUM) engine) can be coupled to the network monitoring probe 142 (e.g., a RUM probe), so as to receive the live network traffic (e.g., live network traffic associated with a client-facing server) collected by the network monitoring probe 142. Examples of the present disclosure can include one network monitoring probe 142 or a plurality of network monitoring probes 142. The live network traffic and/or the inputs can be collected with the network monitoring probe 142 directly from a network device (e.g., switch 116) and/or the live network traffic can be mirrored to the network monitoring engine 144.

The network monitoring engine 144 can be a network monitoring device and/or network monitoring application (e.g., a port sniffer) to mirror the live network traffic, for example. Network traffic (e.g., collected network traffic) that is derived from the network monitoring probe 142, whether by mirroring or other methodology, can be referred to as captured network traffic. Various tools (e.g., computing devices) exist to collect network traffic (e.g., TCP packets), process the captured network traffic (e.g., for business analysis, security analysis, or other use), and/or provide various reports based on the captured network traffic The network monitoring engine 144 can analyze the captured network traffic. Analyzing can, for example, include assembling, filtering, and/or sorting the captured network traffic from the one or more network monitoring probes 142. The network monitoring probe 142 and the network monitoring engine (e.g., computing device) and/or network monitoring application can be coupled in a wired or wireless manner. The network monitoring probe 142 and/or the network monitoring device can be a discrete computing device having processing resource and memory resources. The network monitoring application can be an application running on a separate computing device such as a server, router, switch, etc., or can be provided by another implementation.

In some examples, live network traffic associated with one or more business applications of a business entity can be collected and provided to a business services module (BSM) 146 for data analysis (e.g., identifying the real user issue) and/or data manipulation (e.g., sorting). The BSM 146 can refer to software and/or hardware capable of performing functions including analysis and/or manipulation of data, among other functions. The BSM 146 can be coupled to the network monitoring engine 144. A capture device 148 can be coupled to the BSM 146. The capture device 148 can be coupled to an internal or external computer readable medium 150 to execute instructions to store the captured network traffic in the internal or external non-transitory computer readable medium 150.

As shown in part in FIG. 1, the live environment may include computing networks with machines (e.g., electronic devices) such as routers, switches, hubs, servers, desktop PCs, laptops, workstations, and peripheral devices (e.g., printers, facsimile devices, and scanners, etc.) networked together. Such machines may include processing resources and memory resources and/or logic (e.g., embedded in an (ASIC)).

The live environment may be divided into domains such as mail, applications, databases, network, operating systems, files, internet and/or intranet, among others. Domain may include one or more servers to provide functionality for the domain, such as a web server providing web browsing functionality. Additionally, domains may include a domain manager to control and/or monitor certain aspects within the domain. Specific applications, such as customer relations management, inventory control, a retail website including dynamic marketing aspects, and enterprise accounting, among others, can support one or more business processes.

FIG. 2 illustrates a block diagram of an example of an environment 251 in which various examples may be implemented according to the present disclosure. The environment 251 is shown to include a system for simulating real user issues in support environments (e.g., system 253), support devices 255-1, 255-2, . . . 255-M, user devices 208-1, 208-2, . . . 208-N, and a network 257. The system for simulating real user issues in support environments (e.g., the system 253), as described herein, represents generally a combination of hardware and programming for simulating real user issues in support environments.

For example, as illustrated in FIG. 2, data (e.g., stored data) can be received at support devices 255-1, 255-2, . . . 255-M from a storage device 254. The support devices 255-1, 255-2, . . . 255-M represent generally any computing devices to receive stored data related to an application and/or to simulate the real user issue using the stored data. In some examples, support devices can include a graphical display (e.g., a graphical user interface 256). User devices 208-1, 208-2, . . . 208-N represent generally any computing devices having browsers or other applications to communicate such data (e.g., network traffic and/or inputs). In some examples, user devices 208-1, 208-2, . . . 208-N can include a graphical display (e.g., a graphical user interface 209). Network 257 represents generally one or more of a cable, wireless, fiber optic, or remote connections via a telecommunication link, an infrared link, a radio frequency link, or any other connectors or systems that provide electronic communication. The network 257 can include a link to, for example, an intranet, the Internet, or a combination of both, among other communication interfaces. The network 257 can also include intermediate proxies, for example, an intermediate proxy server (not shown), routers, switches, load balancers, and the like.

According to some examples of the present disclosure, instead of recreating (e.g., generating) network traffic between a "real" user from a "real" source server (e.g., servers 120, 122, 124, 126, 128, 130, 132, 134, and/or 138), network traffic can be simulated in a support environment without having need for the real source server(s) to dynamically generate the load in real time. That is, according to the present disclosure, synthetic network traffic load can be created based on one or more previously captured network traffic files. Synthetic traffic can refer to a network traffic load created based on the captured network traffic rather than live network traffic generated in real time. Network traffic can be collected and captured (e.g., from the live environment). Such captured network traffic can be simulated (e.g., replayed) with and/or without certain modifications as described further below in the support environment. For example, a network traffic file can be collected and captured with various tools from a business entity's live environment, such as in a packet capture (PCAP) file, and stored (e.g., via the internal or external non-transitory computer readable medium 150). PCAP network traffic capture files can be obtained from an application programming interface (API) for capturing network traffic, such as tcpdump (e.g., an open source tool for capturing and dumping packets), Wireshark (e.g., a graphical packet capture and protocol analysis tool), among others.

Open source tools, such as "tcprewrite" can be used to modify captured data packets in a PCAP file, and "tcpreplay" can be used to send packets (original or modified) from a PCAP captured network traffic file to a network computing device. The "tcpreplay" tool can be used for replaying a PCAP captured network traffic file "as is" (e.g., without modification) to a support device, or replaying a PCAP captured network traffic file that has been previously manually modified (e.g., using the "tcprewrite" tool). Accordingly, in some examples, synthetic network traffic load can be created for use in a support environment by modification of information in the data packets of a number of captured network traffic files. The information in the data packets can be modified in real time during replay. The captured network traffic files can be run in replay for a scheduled time in order to simulate a real user issue associated with an application under test in a support environment. According to the present disclosure, the information in the data packets can be modified prior to and/or during replay in such a manner to preserve the integrity of the original TCP/IP conversations (e.g., communications associated with a particular connection).

In some examples, the replayed network traffic can be matched with related inputs, for example, using a session identifier associated with the web browsing session. That is, such matching can include matching a session identifier associated with network traffic (e.g., a packet) with a related session identifier associated with an input (e.g., a user selection). However the disclosure is not so limited. That is, matching can include any suitable technique to match and/or promote matching of the network traffic and the inputs using a session identifier associated with the web browsing session. In this manner, computing devices can be tested using traffic derived from actual user network traffic matched with related inputs (e.g., user inputs) to simulate real user issues in support environments while avoiding the complications and expense (e.g., expenses associated with having each version of a particular server in a live environment in the support environment as well) of having to create such network traffic originally in a support environment, among other advantages.

Such a simulation can include displaying the simulated real user issue via the graphical user interface 256 of the support devices 255-1, 255-2, . . . 255-M. For example, the display of the simulated real user issue can include a display of the captured network traffic, the inputs, notifications (e.g., error notifications), and/or a number of application processes (e.g., a list and/or tree display of the application processes executing in response to the captured network traffic and/or the inputs), among other items associated with the simulated real user issue. Such a display can readily enable support personal to address the real user issue associated with an application, for instance, by modifying the executable code of the application (e.g., executable code related to a particular application process), among other ways to address the real user issue.

Figure 3:
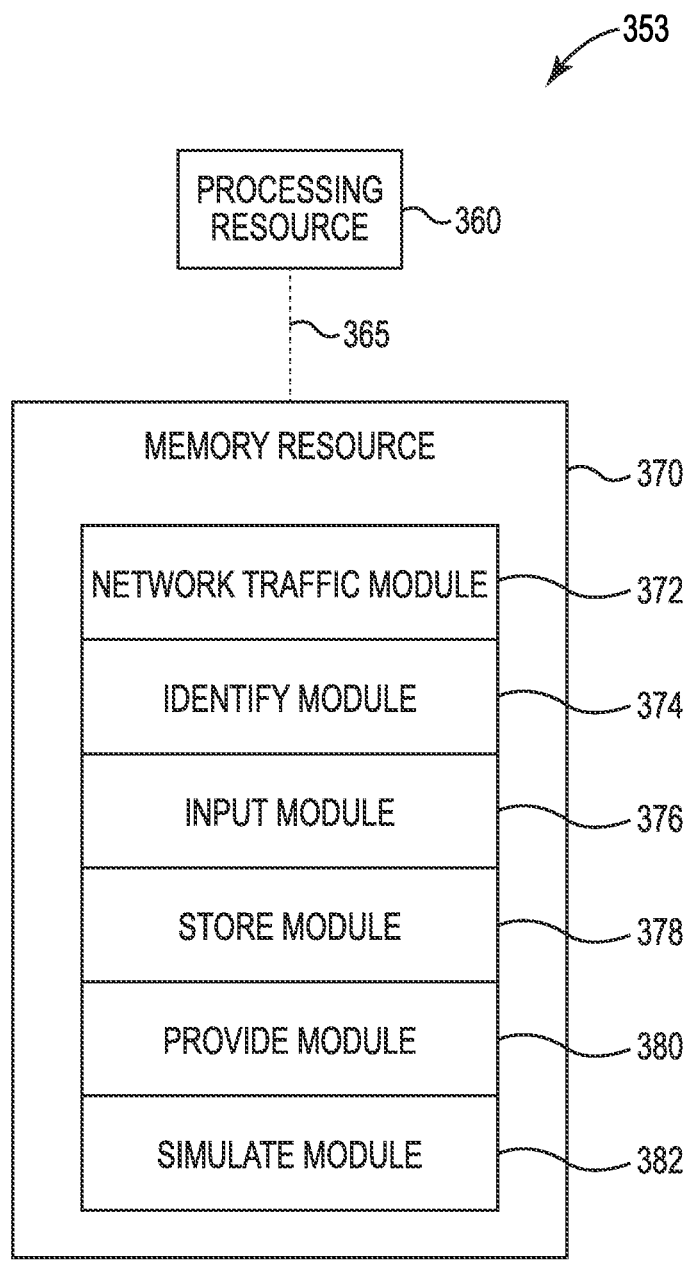
FIG. 3 illustrates a block diagram of an example of a computing system for simulating real user issues in support environments according to the present disclosure.

FIG. 3 illustrates a block diagram of an example of a computing system for simulating real user issues in support environments according to the present disclosure. A computing system 353 can utilize software, hardware, firmware, and/or logic to perform a number of functions. The computing system 353 can be any combination of hardware and program instructions to simulate real user issues in support environments. The hardware, for example can include a processing resource 360, a memory resource 370 (e.g., computer-readable medium (CRM)). A processing resource 360, as used herein, can include any number of processing resources capable of executing instructions stored by a memory resource 370. Processing resource 360 may be integrated in a single device or distributed across devices. The program instructions (e.g., computer-readable instructions (CRI)) can include instructions stored on the memory resource 370 and executable by the processing resource 360 to implement a desired function (e.g., cause the support device to simulate the real user issue using the stored data via a web browser plug-in, etc.). The web browser plug-in can, for example, be a Java® plug-in. However, the disclosure is not so limited. That is the web browser plug-in can be any suitable plug-in to facilitate simulation of the real user issue.

The memory resource 370 can be in communication with a processing resource 360. A memory resource 370, as used herein, can include any number of memory components capable of storing instructions that can be executed by processing resource 360. Such memory resource 370 can be a non-transitory CRM. Memory resource 370 may be integrated in a single device or distributed across devices. Further, memory resource 370 may be fully or partially integrated in the same device as processing resource 360 or it may be separate but accessible to that device and processing resource 360. The computing system 353 may be implemented on a user device, on a support device, a collection of support devices, and/or on a combination of the user device and the support device.

The processing resource 360 can be in communication with a memory resource 370 storing a set of CRI executable by the processing resource 360, as described herein. The CRI can also be stored in remote memory managed by a server and represent an installation package that can be downloaded, installed, and executed.

Processing resource 360 can execute CRI that can be stored on an internal or external memory resource 370. The processing resource 360 can execute CRI to perform various functions, including the functions described herein. For example, the processing resource 360 can execute CRI to cause the support device to simulate the real user issue using the stored data.

The CRI can include a number of modules 372, 374, 376, 378, 380, 382. The number of modules 372, 374, 376, 378, 380, 382, can include CRI that when executed by the processing resource 360 can perform a number of functions. The number of modules 372, 374, 376, 378, 380, 382 can be sub-modules of other modules. For example, the network traffic module 372 and the input module 376 can be sub-modules and/or contained within the same computing device. In another example, the number of modules 372, 374, 376, 378, 380, 382 can include individual modules at separate and distinct locations (e.g., computer-readable medium, etc.).

In some examples, the system can include a network traffic module 372. A network traffic module 372 can include CRI that when executed by the processing resource 360 can provide a number of network traffic functions. The network traffic module 372 can collect network traffic associated with a user device and/or an application, as described herein. For instance, the instructions can, in some examples, include instruction to cause the processing resource 360 to collect network traffic. In some examples, the network traffic module 372 can include instructions to provide the network traffic to a real user monitor (RUM) engine having an ability to modify the network traffic prior to storing the network traffic, the ability to modify includes at least one of assembling, filtering, or sorting the network traffic, among other abilities.

In some examples, the system can include an identify module 374. An identify module 374 can include CRI that when executed by the processing resource 360 can provide a number of identify functions. The identify module 374 can identify a real user issue related to an application using the network traffic. Identification can include identifying issues with a function of an application (e.g., failure of an application and/or a failure of a function of an application to execute), and/or identifying a derivation from a standard (e.g., a performance standard). Examples of such a standard can include, a desired response times (e.g., web page load times) and/or a desired processing speed (e.g., with regard to a given function), among others.

Such identification can be performed by a user (e.g., an employee) and/or automatically by a BSM (e.g., BSM 146). Accordingly, in some examples, the identify module 374 can include instructions to provide the network traffic to a BSM having an ability to identify the real user issue. That is, in some examples, the BSM can identify the real user issue based on the stored data.

An input module 376 can include CRI that when executed by the processing resource 360 can perform a number of input functions. The input module 376 can include instructions to collect inputs provided via the user device. Examples of such instructions include JavaScript® instructions, among others suitable to collect inputs provided via the user device. The instructions can, for example, be stored in an internal or external computer readable medium coupled to the capture device (e.g., the capture device 148) that can execute instructions stored in the internal or external non-transitory computer readable medium (e.g., in the CRM 150). The input module 376 can be continuously run to collect inputs provided via the user device. Alternatively or in addition, in various examples, such collection can occur in response to the real user issue being identified, for example, by the identify module 374.

A store module 378 can include CRI that when executed by the processing resource 360 can perform a number of store functions. The store module can store the network traffic and the inputs as stored data. The stored data can be stored in a CRM (e.g., in the CRM 150). In some examples, the CRM can be included in a cloud system (e.g., a public and/or private cloud system) that can include a number of cloud resources (e.g., cloud servers). In some examples, the stored data can be stored for a predetermined duration of time and removed from a storage resource (e.g., storage device 254 as illustrated in FIG. 2) following the predetermined duration.

A provide module 380 can include CRI that when executed by the processing resource 360 can perform a number of provide functions. The provide module 380 can provide the stored data to a support device having an ability to modify the application, the support device in a support environment being separate and distinct from the user device. In some examples, the provide module 380 can include instructions to provide the stored data to the support device via a proxy server (not shown) coupled to the test device.

A simulate module 382 can include CRI that when executed by the processing resource 360 can perform a number of simulate functions. The simulate module 382 can cause the support device to simulate the real user issue in response to receipt of the stored data. A memory resource 370, as used herein, can include volatile and/or non-volatile memory. Volatile memory can include memory that depends upon power to store information, such as various types of dynamic random access memory (DRAM), among others. Non-volatile memory can include memory that does not depend upon power to store information.

The memory resource 370 can be integral, or communicatively coupled, to a computing device, in a wired and/or a wireless manner. For example, the memory resource 370 can be an internal memory, a portable memory, a portable disk, or a memory associated with another computing resource (e.g., enabling CRIs to be transferred and/or executed across a network such as the Internet).

The memory resource 370 can be in communication with the processing resource 360 via a communication path 365. The communication path 365 can be local or remote to a computing device associated with the processing resource 360. Examples of a local communication path 365 can include an electronic bus internal to a computing device where the memory resource 370 is one of volatile, non-volatile, fixed, and/or removable storage medium in communication with the processing resource 360 via the electronic bus.

The communication path 365 can be such that the memory resource 370 is remote from the processing resource (e.g., 360), such as in a network connection between the memory resource 370 and the processing resource (e.g., 360). That is, the communication path 365 can be a network connection. Examples of such a network connection can include a local area network (LAN), wide area network (WAN), personal area network (PAN), and the Internet, among others. In such examples, the memory resource 370 can be associated with a first computing device and the processing resource 360 can be associated with a second computing device (e.g., a Java® server). For example, a processing resource 360 can be in communication with a memory resource 370, wherein the memory resource 370 includes a set of instructions and wherein the processing resource 360 is designed to carry out the set of instructions.

The processing resource 360 coupled to the memory resource 370 can execute CRI to perform various functions. CRI can be executed to collect network traffic associated with a user device in a live environment. CRI can be executed to identify a real user issue related to an application using the network traffic. CRI can be executed to collect inputs provided via the user device in response to the real user issue being identified. CRI can be executed to store the network traffic and the inputs as stored data. CRI can be executed to provide the stored data to a support device having an ability to modify the application. In various examples, the support device can be in a support environment being separate and distinct from the live environment (e.g., the user device). CRI can be executed to cause the support device to simulate the real user issue in response to receipt of the stored data.

As used herein, "logic" is an alternative or additional processing resource to execute the actions and/or functions, etc., described herein, which includes hardware (e.g., various forms of transistor logic, application specific integrated circuits (ASICs), etc.), as opposed to computer executable instructions (e.g., software, firmware, etc.) stored in memory and executable by a processing resource.

Figure 4:
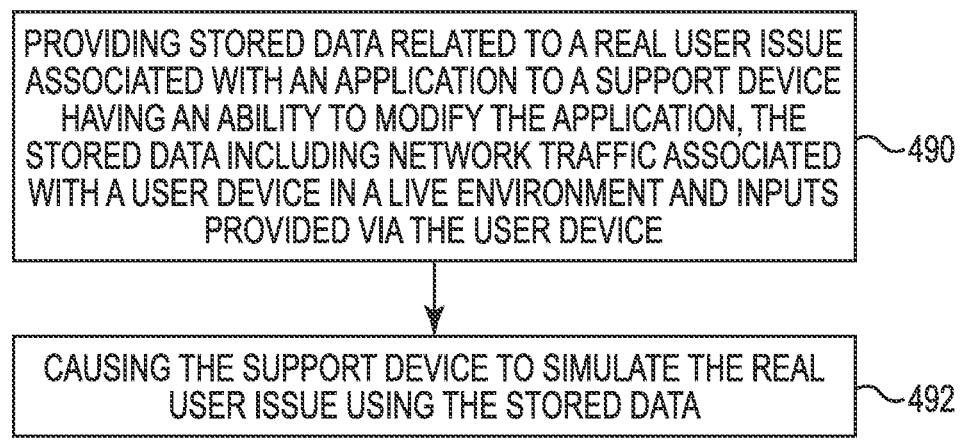
FIG. 4 illustrates a block diagram of an example of a method for simulating real user issues in support environments according to the present disclosure.

FIG. 4 illustrates a block diagram of an example of a method for simulating real user issues in support environments according to the present disclosure. As shown at block 490, in various examples, the method can include providing stored data related to a real user issue associated with an application to a support device having an ability to modify the application, the stored data including network traffic associated with a user device in a live environment and inputs provided via the user device. That is, providing can include executing instructions stored in memory to provide stored data related to a real user issue associated with an application to a support device having an ability to modify the application.

In some example, the method can include requesting the application via the user device, for example, using a hypertext transfer protocol request. However, the disclosure is not so limited. That is, the user device and/or the support device can request the application in any suitable format to request the application. In some example, the method can include collecting the inputs, as described herein, which can be provided via a graphical user interface of the user device, for example, during a web browsing session.

In some examples, the method can include matching the network traffic and the inputs using a session identifier associated with the web browsing session. Such matching can include matching a session identifier associated with network traffic (e.g., a packet) with a related session identifier associated with an input (e.g., a user selection). However the disclosure is not so limited. That is, matching can include any suitable technique to match and/or promote matching of the network traffic and the inputs using a number of identifiers, as described herein.

The method can, in some examples, include prioritizing a number of issues. For example, a particular issue can be prioritized, for example, as a high priority, a medium priority, and/or low priority, among others. Such a categorization (e.g., whether a given issues is of a low, medium, or high priority) can be made by a user, a support personnel (e.g., an IT administrator) and/or be based upon a SLA. Such prioritizing can represent an order (e.g., a hierarchal order) in that the issues (e.g., real user issues) can be simulated by the support device, as described herein.

As shown at block 492, in various examples, the method can include causing the support device to simulate the real user issue using the stored data. Causing can include executing instruction stored in memory to directly cause the support device to simulate the real user issue using the stored data and/or to communicate data with an expectation that it be processed by another device to cause the support device to simulate the real user issue using the stored data. In some examples, the method can include causing the support device to simulate the real user issue using the support data in response to receiving the stored data at the support device in a support environment that is separate and distinct from a live environment, as described herein.

In some examples, the method can include obfuscating the stored data to obscure at least some of the stored data prior to providing the stored data to the support device. Obfuscating can refer to obscuring at least a portion of the stored data prior to providing the stored data to the support device. Such obscuring can be useful to secure confidential and/or otherwise sensitive information, for example, by obscuring such information from the support device (e.g., support personal operating the support device).

In some examples, the method can include modifying the application to address (e.g., resolve) the real user issue. Such a modification (e.g., debugging) can include modifying the executable code and/or settings associated with the application, for example prefetching settings and/or packet routing, among other settings associated with the application. In some examples, the modified code and/or modified settings (e.g., prefetching settings) can, for example, replace previous code and/or previous settings. For instance, in some examples, instructions can be provided to the user device to modify settings associated with the user device in response to the real user issue being determined (e.g., by the support personnel) to be related to the settings associated with the user device. The modified code and/or the modified settings can be stored, for example, as a set of instructions in a computer readable medium. However, the disclosure is not so limited. That is, the modification can include modifying a suitable component directly or indirectly associated with the application that is suitable to address the real user issue.

In some examples, such a modification can be implemented immediately following the modification, after a predetermined time following the modification, and/or at a predetermined time of day. For example, a predetermined time could correspond to a time generally associated with a comparatively low number of users (e.g., during nighttime hours). The predetermined time can be a regularly scheduled time (e.g., reoccurring) and/or specified by the support personnel (e.g., an IT administrator).

The specification examples provide a description of the applications and use of the system and method of the present disclosure. Since many examples can be made without departing from the spirit and scope of the system and method of the present disclosure, this specification sets forth some of the many possible example configurations and implementations.

What is claimed:

1. A method for simulating a real user issue in a support environment, comprising:
    collecting network traffic between a user device and a server device within a live environment;
    collecting respective input type identifiers of physical inputs provided by a user via a graphical user interface of the user device, wherein each respective input type identifier denotes a corresponding physical input of the physical inputs provided by the user as a particular type of physical input, and wherein each of the physical inputs has a respective identifier of an element that the input acted upon, comprising:
        collecting a first physical input of the physical inputs as input provided by the user via the graphical user interface of the user device preceding the network traffic;
        collecting a second physical input of the physical inputs as input provided by the user via graphical user interface of the user device after the network traffic;
    providing stored data related to the real user issue associated with an application to a support device that is to modify the application, the stored data including network traffic associated with a user device in the live environment and the collected respective input type identifiers; and
    causing the support device to simulate the real user issue using the stored data, comprising:
        matching the first physical input and the second physical input to the captured network traffic;
        creating a synthetic network load from the captured network traffic in the support environment in which the user device and the server device are not present, neither the user device nor the server device having to generate or recreate a network load; and
        displaying information representative of the captured network traffic as matched to the collected physical inputs provided by the user.

2. The method of claim 1, wherein the method includes requesting the application via the user device using a hypertext transfer protocol request.

3. The method of claim 1, wherein collecting includes collecting inputs provided via a graphical user interface of the user device during a web browsing session.

4. The method of claim 1, wherein causing includes causing the support device to simulate the real user issue using the stored data in response to receiving the stored data at the support device in a support environment that is separate and distinct from the live environment.

5. The method of claim 1, wherein the method includes obfuscating the stored data to obscure at least some of the stored data prior to providing the stored data to the support device.

6. The method of claim 1, wherein the method includes modifying the application to address the real user issue.

7. A non-transitory computer-readable medium storing a set of instructions to simulate a real user issue in a support environment executable by a processing resource to:
    collect respective input type identifiers of physical inputs provided by a user via a graphical user interface of a user device in a live environment in response to the real user issue being identified, wherein each respective input type identifier of the respective input identifiers denotes a corresponding physical input of the physical inputs provided by the user as a particular type of physical input, including:
        collecting a first physical input of the physical inputs as input provided by the user via the graphical user interface of the user device preceding network traffic of a web browsing session and between the user device and a server device within the live environment;
        collecting a second physical input of the physical inputs as input provided by the user via the graphical user interface of the user device responsive to the network traffic of the web browsing session;
    provide stored data related to the real user issue associated with an application via a web browser plug-in to a support device that is to modify the application, the stored data being network traffic associated with a user device in the live environment and the respective input type identifiers; and cause the support device in the support environment to simulate the real user issue in response to receipt of the stored data, including:

matching the first physical input and the second physical input to the network traffic;

creating a synthetic network load from the network traffic in the support environment in which the user device and the server device are not present, neither the user device nor the server device having to generate or recreate a network load; and displaying information representative of the network traffic as matched to the collected physical inputs provided by the user.

8. The medium of claim 7, wherein the instructions, when executed, cause the processing resource to provide instructions to the user device to modify settings associated with the user device in response to the real user issue being determined to be related to the settings associated with the user device.

9. The medium of claim 7, wherein the instructions, when executed, cause the processing resource to collect the network traffic and store both the network traffic and the collected inputs as the stored data in a storage resource coupled to the processing resource.

10. A system including a user device and a support device, the system for simulating a real user issue in a support environment, the system comprising a memory resource and hardware including a processing resource, the processing resource in communication with the memory resource, the memory resource including a set of instructions and the processing resource is designed to carry out the set of instructions to:

collect network traffic between a user device and a server device within a live environment;

automatically identify the real user issue related to an application using the network traffic;

collect respective input type identifiers of physical inputs provided by a user via a graphical user interface of the user device in a live environment and in accordance with a web browsing session in response to the real user issue being identified, wherein each respective input type identifier of the respective input identifiers denotes a corresponding physical input of the physical inputs provided by the user as a particular type of physical input;

store the network traffic and the inputs as stored data;

provide the stored data to the support device that is to modify the application, the support device in the support environment being separate and distinct from the user device in the live environment; and cause the support device to simulate the real user issue in response to receipt of the stored data, including:

matching the physical inputs to the captured network traffic of the web browsing session;

creating a synthetic network load from the captured network traffic in the support environment in which the user device and the server device are not present, neither the user device nor the server device having to generate or recreate a network load, and displaying information representative of the captured network traffic as matched to the collected respective input type identifiers of the physical inputs provided by the user.

11. The system of claim 10, wherein the instructions to identify the real user issue include instructions to provide the network traffic a business services module that is to automatically identify the real user issue.

12. The system of claim 10, wherein the instructions are executable to provide the network traffic to a real user monitor engine that is to modify the network traffic prior to causing the support device to simulate the real user issue, and wherein modifying the network traffic includes at least one of assembling, filtering, or sorting the network traffic.

13. The system of claim 10, wherein the instructions include instructions to provide the stored data to the support device via a proxy server coupled to a test device.

14. The system of claim 10, including instructions to collect the respective input type identifiers via a network monitoring probe.

* * * * *